United States Patent [19]
Schonert et al.

[11] 3,851,148
[45] Nov. 26, 1974

[54] POWER CONTROL METHOD AND APPARATUS

[75] Inventors: Heinz E. Schonert, Terrance, British Columbia; Robert H. Jones, Willowdale, Ontario, both of Canada

[73] Assignee: Western Stress Relieving Services Inc., Mississauga, Ontario, Canada

[22] Filed: Sept. 18, 1973

[21] Appl. No.: 398,326

[30] Foreign Application Priority Data
Sept. 22, 1972 Great Britain .................... 43988/72

[52] U.S. Cl. .................. 219/503, 219/497, 219/505
[51] Int. Cl. ............................................ H05b 1/02
[58] Field of Search ........... 219/483, 486, 494, 497, 219/499, 503, 501, 505

[56] References Cited
UNITED STATES PATENTS

| | | | |
|---|---|---|---|
| 3,202,800 | 8/1965 | Phillips et al. | 219/497 |
| 3,311,734 | 3/1967 | Peterson | 219/503 X |
| 3,432,643 | 3/1969 | Finnegan et al. | 219/503 X |
| 3,787,729 | 1/1974 | Bennett | 219/486 X |

*Primary Examiner*—J. D. Miller
*Assistant Examiner*—Fred E. Bell
*Attorney, Agent, or Firm*—Fleit & Jacobson

[57] ABSTRACT

A power control method and apparatus for weld stress relief employ first and second voltage control means for supplying different control voltages to a saturable reactor for regulating the supply of power to heaters. By sensing the temperatures of different workpiece zones to provide temperature signals, switch means are automatically actuated when the temperature signals differ by a predetermined amount and thereby the voltage to the saturable reactor is changed, by changing over from one to the other of the voltage control means, and simultaneously one of the heaters is de-energized.

17 Claims, 5 Drawing Figures

FIG. 3 PROGRAMMER LOGIC SEQUENCE BLOCK DIAGRAM

POWER CONTROL METHOD AND APPARATUS

The present invention relates to power supply apparatus for heating elements, and to methods of heating objects, and is particularly but not exclusively concerned with apparatus and methods for the preheat treatment and stress relieving of pipe welds and other welds.

The processes of preheating and stress relieving are becoming increasingly important with the advent of new alloys and advances in the metallurgical technology associated with the design of modern refineries, nuclear establishments, chemical plants, gas and oil pipelines and the like.

It will be appreciated that it is frequently impractical to perform the heat treatment operations associated with welding such fabrications in a conventional furnace, since the welds are formed between structural parts which cannot be moved, and which are frequently located several hundred feet above ground level, for example on pipe-work associated with pressure vessels, towers and the like.

Moreover, since it is desirable to be able to treat, for example, pipes of widely varying dimensions, it will be evident that the power required for heating varies considerably from one weld to another. For this reason, it is usual to employ series type heaters connected together as required for stress relieving, these heaters commonly being referred to as "finger elements" and being designed for operation at a maximum current of 120 amperes.

For stress relieving and preheat treatment, a particular rate of temperature rise, a predetermined soaking period and a particular rate of temperature decrease are usually specified, and it is often important to ensure in addition that the temperature of the object being heated is controlled accurately, i.e., to within ± 1 percent.

Hitherto, welding machines have been employed to provide power to the heating elements. However, the use of welding machines has various disadvantages. For example, since welding machines are designed to operate at predetermined current/voltage parameters, decreasing part of the heating load, which is sometimes necessarily caused by de-energization of one of a plurality of heaters being used, causes an increase in the voltage to the remaining heating elements. Consequently, the welding machine requires manual readjustment whenever the load is altered. Also, since it is customary to operate welding machines at not more than 60% of their welding current capacity when they are employed for continuous duty in stress relief, a welding machine is of considerable bulk and weight, and has a comparatively low power output, for such use.

In addition, to avoid employing welding machines as heating power sources when they may be required for welding, it is preferable to provide other apparatus as a heating power source.

The use of transformers with appropriate switch gear and control systems can achieve the high degree of accuracy in heating power control and temperature measurement which is required, for example, for alloys which are heat-treated to a temperature just below their transformation temperature. However, these arrangements are more suitable to heater units of fixed resistance designed for a predetermined maximum voltage, a plurality of heater elements being connected in parallel if required. To obtain the versatility required for workpieces of widely varying dimensions, using heater elements some of which are de-energized during the treatment, numerous transformer tappings and switches would be required, rendering the apparatus difficult to control under widely varying circumstances.

It is accordingly an object of the present invention to provide an efficient and compact power source apparatus for use in energizing heating elements for on-site preheat treatment and stress relieving of welds.

According to the present invention, power supply and control apparatus for pre-weld heating and weld stress relief, comprises: a first and second electrical resistance heating elements; means for connecting said first and second electrical resistance heater elements in series with one another for heating different workpiece zones; a power transformer for supplying electrical power to said first and second electrical resistance heating elements; a saturable reactor connected between said transformer and said first and second electrical resistance heating elements for controlling the supply of electrical power from said transformer to said first and second electrical resistance heater elements; first voltage control means for providing a first control voltage to said saturable reactor to provide a predetermined electrical power to said first and second electrical resistance heating elements; second voltage control means for providing a second control voltage to said saturable reactor to control said saturable reactor for providing a lower electrical power to said first electrical resistance heating element; first and second temperature responsive means respectively associated with said first and second electrical resistance heating elements for providing temperature signals corresponding to the temperatures of the respective workpiece zones of said first and second electrical resistance heating elements; means for comparing the temperature signals from said first and second temperature responsive means and providing an output signal when the difference between the temperature signals exceed a predetermined amount; switch means responsive to said output signal for disconnecting said first voltage control means from said saturable reactor and connecting said second voltage control means to said saturable reactor; and means responsive to said output signal for short-circuiting one of said first and second electrical resistance heating elements to thereby interrupt heating of the hottest of said workpiece zones by said one of said heating elements.

The invention will be more readily understood from the following description of a preferred embodiment thereof given, by way of example, with reference to the accompanying drawings, in which:

FIG. 5 shows a modification of the arrangement of heating elements of the apparatus illustrated in FIG. 1.

Figure 1:
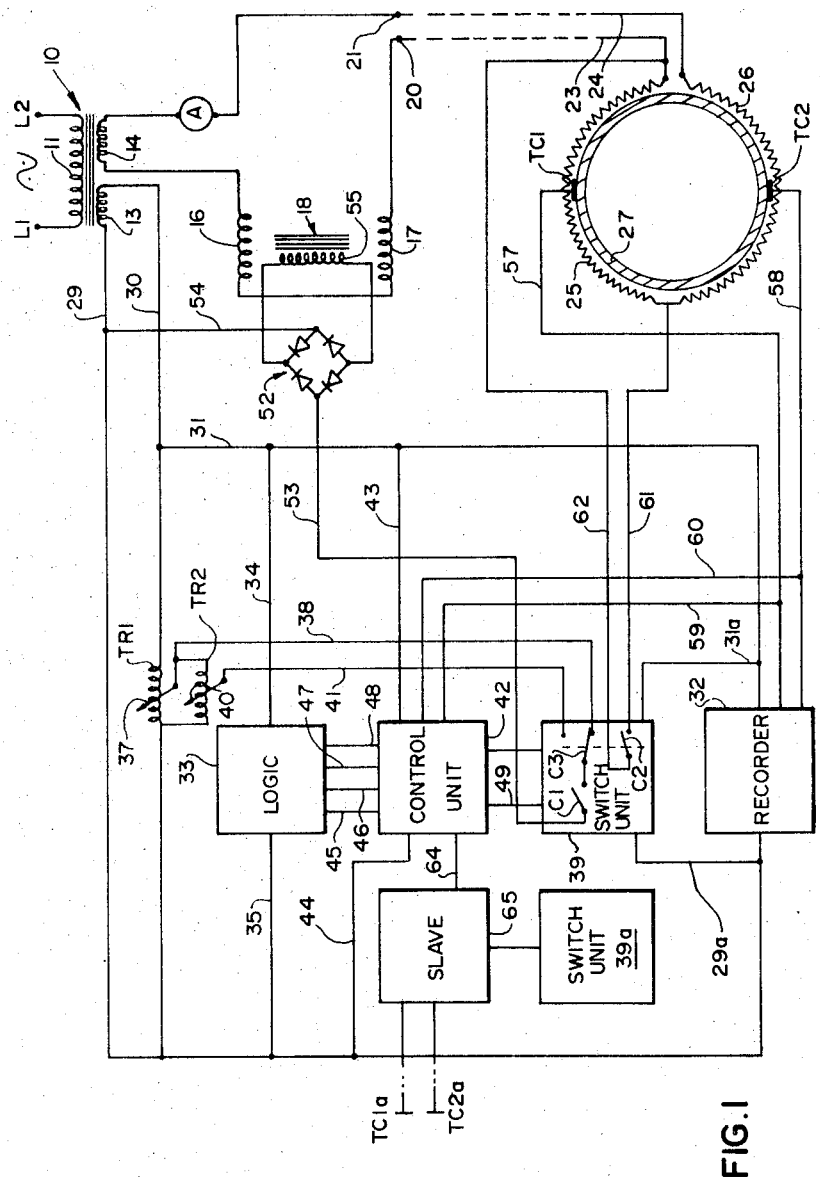
FIG. 1 shows a circuit diagram of power supply and control apparatus embodying the invention.

Referring firstly to FIG. 1, it will be seen that the present apparatus has a power transformer, indicated generally by reference numeral 10, the primary winding 11 of which has terminals L1 and L2 for connection to an A.C. electricity supply network. The transformer 10 has two secondary windings 13 and 14.

The secondary winding 14 of the transformer 10 is connected in series with windings 16 and 17 of a saturable reactor, which is indicated generally by reference numeral 18, and with one of a pair of power output terminals 20 and 21.

The saturable reactor 18 serves to control power supplied from the transformer secondary winding 14 through power output terminals 20 and 21 and through heavy duty leads 23 and 24 to two heating elements 25 and 26.

The heating elements 25 and 26 are connected in series with one another across the leads 23 and 24 and are disposed around the exterior of a workpiece in the form of a pipe 27 which is to be heated. The leads 23 and 24 are of a length sufficient to enable the heating elements 25 and 26 to be employed at a distance from the power transformer 10 and the saturable reactor 18.

The power supply voltage is transformed by the transformer 10 to provide a voltage level sufficiently low to be non-hazardous to the operating personnel and to minimize electrical insulating requirements at the workpiece.

The auxiliary secondary winding 13 of the transformer 10 is connected across conductors 29 and 30, which apply the voltage of the secondary winding 13 to a variable auto-transformer TR1. This voltage is also applied to the recorder 32 via conductor 31 connected between the conductor 30 and a recorder 32, and via the conductor 29, which extends to the recorder 32. In addition, this voltage is applied to a logic network 33, via conductors 34 and 35 which are connected between the conductors 31 and 29, respectively, and the logic network 33, and to a switch unit 39 by conductors 29a and 31a.

The auto-transformer TR1 has an adjustable contact 37 connected by conductor 38 to a awitch unit 39. A second auto-transformer TR2 has its winding connected between the conductor 30 and the condutor 38 and has its movable contact 40 connected to the switch unit 39 by conductor 41.

A control unit 42 is connected across the conductors 31 and 29 by conductors 43 and 44, respectively. The logic network 33 is connected to the control unit 42 by four conductors 45 to 48, and the control unit 42 is connected to the switch unit 39 by conductor 49. The switch unit 39 is connected to to one arm of a rectifier bridge 52 by a conductor 53. The opposite arm of the rectifier bridge 52 is connected by conductor 54 to the conductor 29, and the rectifier bridge 52 serves to provide a controlled D.C. voltage through a control winding 55 of the saturable reactor 18, as described in greater detail hereinafter.

A pair of thermocouples TC1 and TC2 are provided at the top and bottom, respectively, of the pipe 27 and are connected by respective conductors 57 and 58 to the recorder 32.

The conductors 57 and 58 are connected, by conductors 59 and 60, to respective inputs of the control unit 42.

The opposite ends of the heating element 25 are connected by conductors 61 and 62 to the switch unit 39, which can be operated as described hereinafter to short circuit the heating element 25 through the conductors 61 and 62.

An ammeter is connected in series with the secondary winding 14 to provide an indication of the current flowing through the heating elements 25 and 26 and the components connected in series therewith.

Figure 2:
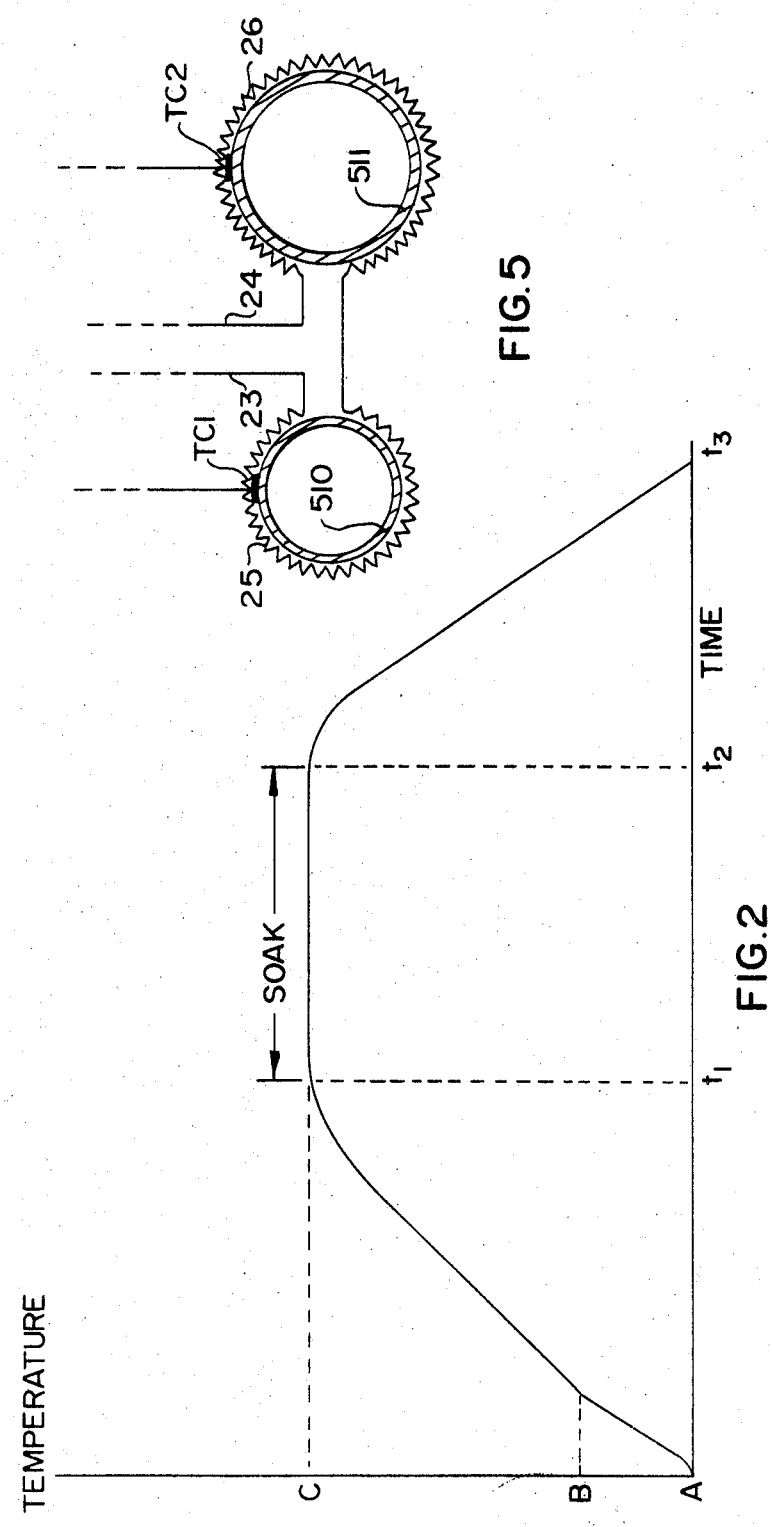
FIG. 2 shows a graph showing the variation in the temperature of a workpiece heating by means of the apparatus of FIG. 1.

An illustration of the variation of the temperature of the pipe 27 which can be achieved employing the apparatus shown in FIG. 1 is given in FIG. 2, which shows a graph of the temperature of the pipe 27 plotted against time.

As shown in FIG. 2, the temperature of the pipe 27 can be caused to increase at a rapid rate from its initial value A to a predetermined starting value B, which is the starting temperature of the automatically controlled programme of temperature variation, as described in greater detail hereinafter. The temperature then increases from starting temperature B to soak temperature C at a carefully controlled rate, after which the temperature is maintained at the predetermined soak temperature C for a time $t1$ to $t2$. The heating is then discontinued and the temperature decreases to the temperature A in time $t2$ to $t3$. This control of the temperature is effected by presetting the logic network 33 in accordance with the required temperature programme, after which the temperature of the pipe 27, as sensed by the thermocouples TC1, and TC2, is automatically compared with a demand temperature signal supplied by the logic network 33 for controlling the voltage applied by conductor 53 and rectifier bridge 52 to the saturable reactor 18, whereby the power supplied to the heating elements 25 and 26 is varied in accordance with the demand temperature signal.

Figure 3:
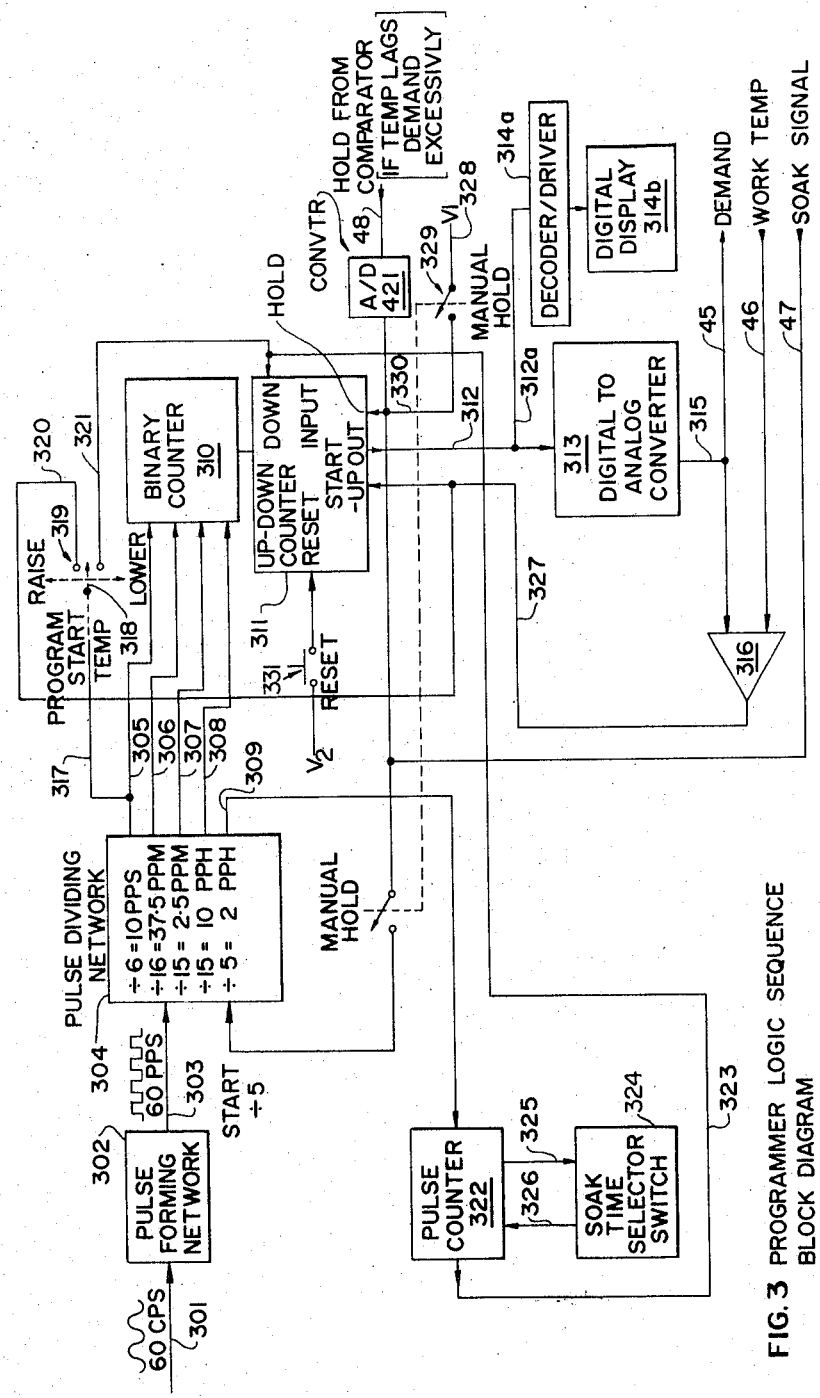
FIG. 3 shows a block diagram of a logic network forming part of the apparatus of FIG. 1.

The logic network 33 is illustrated in greater detail in FIG. 3, which shows an input line 301 for connection to the conductor 34 to provide an input waveform which varies sinusoidally at the frequency of the power supply. The line 301 is connected to a pulse shaper 302, the purpose of which is to shape the sinusoidal waveform of the electricity supply on line 301 into substantially rectangular, rectified pulses on a conductor 303, by which these rectangular pulses are applied to a pulse dividing network 304 serving as a clock.

The pulse dividing network 304 has five pulse output conductors 305 to 309 and supplies pulse trains of different frequencies to the pulse output conductors 305 to 309.

More particularly, the pulse dividing network 304 supplies output pulses at the rate of 10 pulses per second to the conductor 305, 37.5 pulses per minute to the conductor 306, 2.5 pulses per minute to the conductor 307, ten pulses per hour to the conductor 308 and two pulses per hour to the conductor 309.

The conductors 305 to 308 are connected to respective inputs of a binary counter 310, the output of which is connected to an up-down counter 311. The binary counter 310 counts the pulses from the pulse dividng network 304 and transmits a pulse to the up-down counter 311 each time the binary counter 310 reaches a predetermined count. The binary counter 310 is adjustable for varying this count and thereby varying a demand signal transmitted from the up-down counter 311 on conductor 312 and for this purpose the binary counter is conveniently calibrated in increments each representing a change of the demand signal corresponding to a change of 50° per hour of the rate of change of the workpiece temperature.

The up-down counter 311 counts the pulses received from the binary counter 310 and provides on the conductor 312 the above-mentioned digitally encoded demand signal, which represents the required temperature of the workpiece and which corresponds at any moment to the count reached by the up-down counter 311.

The conductor 312 is connected to a digital-to-analogue converter 313 and, via conductor 312a through a decoder 314a to a digital display unit 314b which provides a visual indication of the demand temperature.

The output of the digital-to-analogue converter 313 is connected by a conductor 315 to the conductor 45, which is connected at one end to a comparator 316 and at its other end to the control unit 42 illustrated in FIG. 4 and described hereinafter.

The output conductor 305 of the pulse dividing network 304 is connected by a conductor 317 to movable contact 318 of a two-way switch which is indicated generally by reference numeral 319 and which has its stationary contacts connected by respective conductors 320 and 321 to respective inputs of the up-down counter 311.

The output conductor 309 of the pulse dividing network 304 is connected to the input of a pulse counter 322, the output of which is connected by conductor 323 to a count-down input of the up-down counter 311. A soak time selector switch 324, the function of which will be described hereinafter, is connected to the pulse counter 322 by conductors 325 and 326.

A conductor 328 is connected between a voltage source V and the movable contact of a manually operable "reset" switch 329, the fixed contact of which is connected by conductor 330 to a "hold" input of the up-down counter 311. A manually-operable reset switch 331 is provided between a voltage source V2 and a "reset" terminal of the updown counter 311.

Figure 4:
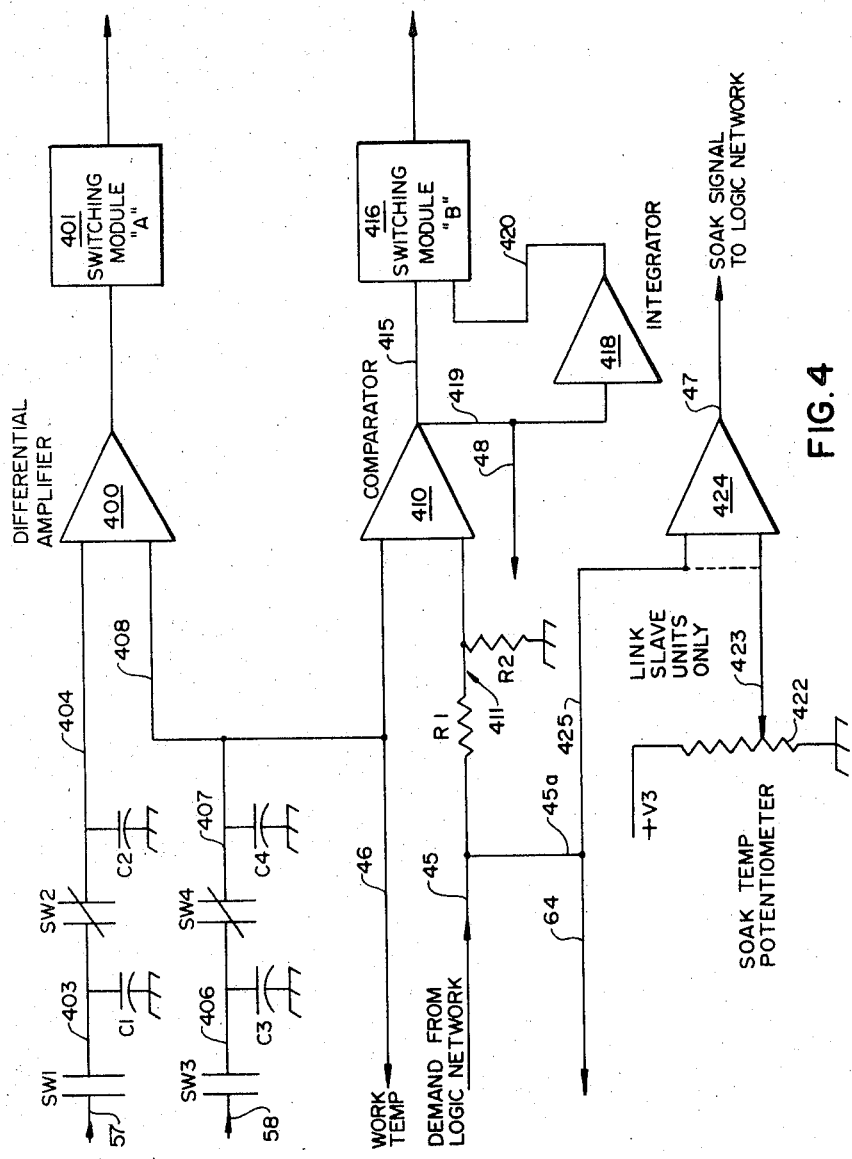
FIG. 4 shows a block diagram of a control unit forming part of the apparatus of FIG. 1.

FIG. 4 shows in greater detail the control unit 42, which has a differential amplifier 400 for providing an output signal to a switching module 401 in response to the temperature signals transmitted from the thermocouples TC1 and TC2. Switches SW1 and SW2 are connected in series, by conductor 403, between the conductor 57 extending from the uppermost thermocouple TC1 and a conductor 404 extending to one input of the differential amplifier 400. Switches SW3 and SW4 are connected in series with one another by conductor 406 between conductor 58, extending from the lowermost thermocouple TC2, and conductor 407, which is in turn connected by conductor 408 to another input of the differential amplifier 400.

Capacitors C1 and C2 are connected between ground and the conductors 403 and 404, respectively, and capacitors C3 and C4 are connected between ground and the conductors 406 and 407, respectively.

The purpose of the switches SW1 – Sw4 and the capacitors C1 – C4 is to avoid direct application of the temperature signals from the thermocouples TC1 and TC2 from conductors 57 and 58 to the differential amplifier 400 by forming a sample and hold arrangement. More particularly, the switches SW1 and SW2 are oscillator-controlled switches of a type well known to those skilled in the art and operate in synchronism with one another in such a manner that they are always in opposite mode, i.e., such that switch SW1 is closed when switch SW2 is open and vice versa. The voltage generated in thermocouple TC1 and forming one of the thermocouple temperature signals is applied through conductor 57, switch SW1, when closed, and conductor 403 to capacitor C1 to charge the latter. Upon subsequent opening of switch SW1 and closure of switch SW2, this charge is transferred from capacitor C1 to capacitor C2 to provide a corresponding voltage at the respective input of differential amplifier 400. Switches SW3 and SW4 and capacitors C3 and C4 operate in a similar manner.

The conductor 407 is connected via conductor 408 to one input of a comparator 410, another input of which is connected through an attenuator, indicated generally by reference numeral 411, to demand signal conductor 45 extending from the logic network shown in FIG. 3. In addition, it will be seen from FIG. 3 that the conductor 46 is connected to an input of the comparator 316, so that the temperature signal representing the temperature of the pipe 27 and supplied from thermocouple TC2 via conductor 58, switches SW3 and SW4, and conductors 408 and 46 is applied to the start binary counter 316. A conductor 64 connected to the conductor 45 by a conductor 45a extends to a slave unit 65, controlled by the control unit 42, for applying to the slave unit 65 the demand signal supplied from the logic network 33 on conductor 45.

The output of the comparator 410 is applied by conductor 415 to the input of a switching module 416, which controls the switching on and off the power supply to the heating elements 25 and 26.

An integrator 418 is connected by conductors 419 and 420 between the comparator 410 and the switching module 416, and the conductor 419 is connected to an input of the pulse dividing network 304 by the conductor 48, which is also connected to a "hold" input of the updown counter 311 and has a analog to digital converter 421.

A variable resistor indicated generally by reference numeral 422 and connected between a voltage source V3 and ground is provided for presetiting the soak temperature B. The variable resistor 422 is connected between ground and a predetermined voltage, and its movable contact connected, by conductor 423, to one input of a comparator 424. The demand signal from the conductor 45 is applied to another input of the comparator 424 by means of a conductor 425. When the voltage of the demand signal on the conductor 425 is equal to the voltage derived from the variable resitor 422, the comparator 424 provides an output signal on the conductor 47, which is applied to the logic network 33 and thereupon initiates the soak-timing circuitry and effects control of the temperature demand signal such that the latter remains constant.

The slave unit 65, which may be one of a plurality of such units controlled by the control unit 42, is provided for controlling a further set of heating elements, by means of a further saturable reactor, and is similar in construction to the control unit 42 as illustrated in FIG. 4, except that in the case of slave unit 65 the conductor 425 is connected to the conductor 423, as is indicated by a broken line in FIG. 4. The demand signal for controlling the slave unit 65 is obtained from the control unit 42 via the conductor 64, and this demand signal may if desired be passed from the slave unit 65 to a further slave unit (not shown) via another conductor. The slave unit would be provided with a switch unit 39a, corresponding to switch unit 39, and would be connected to thermocouples TC1a and TC2a, corresponding to the thermocouples TC1 and TC2. In addition, the slave unit 65 is connected by conductors (not shown) to the conductors 29 and 31 for energizing the slave unit 65.

The operation of the above-described apparatus is as follows:

The power supply to the power transformer 10 through the terminals L1 and L2 and applied to the heating elements 25 and 26 is controlled, as stated above, by the saturable reactor 18 during the operation of the apparatus. The saturable reactor 18 is in turn controlled by the logic network 33 and the control unit 42.

When the heating elements 25 and 26 are thus energized, the heat in the interior of the pipe 27 will tned to rise and accordingly the uppermost portion of the pipe 27 will be subjected to greater heating than the lowermost portion of the pipe 27. To counteract this, the switch unit 39 is operated, as described in greater detail below, to short circuit the heating element 25 through the conductors 61 and 62, whereupon the power supplied through the leads 23 and 24 energizes the lowermost heating element 26 but no longer energizes the uppermost heating element 25.

When the switch unit 39 is operated to form a connection between the conductors 61 and 62, the control signal on the conductor 53 for operating the reactor 18 is smultaneously and correspondingly adjusted to compensate for the reduction in the load resulting from the shaft circuiting of the heating element 25.

More particularly, the temperatures of the upper and lowermost portions of the pipe 27 are sensed by the thermocouples TC1 and TC2, which supply the corresponding temperature signals to the control unit 42. These temperature signals are simultaneously supplied to the recorder 32. The control unit 42 compares the two signals, as described in greater detail hereinafter, and when the temperture signal on the conductor 57 from the uppermost thermocouple TC1 exceeds that on the conductor 58 from the lowermost thermocouple TC2 by a predetermined amount, the control unit 42 operates the switch unit 39 to close contact C2 between the conductors 61 and 62 and simultaneously to actuate contact C3 through which the voltage of the power transformer secondary winding 13, stepped down by the transformer TR1, was employed to provide the control signal on conductor 53 and to connect contact C3 to conductor 41 to apply a lower voltage, stepped down by the auto-transformer TR2, for this purpose. The voltage provided by the auto-transformers TR1 and TR2 can, of course, be preset by adjustment of the movable contacts 37 and 40.

The logic network 33 and the control unit 42 cooperate to control the operation of the switch unit 39. For this purpose, the voltage applied by conductors 34 and 301 to pulse shaper 302, as shown in FIG. 3, is shaped by the pulse shaper 302 into a train of substantially rectangular pulses of the same frequency. These pulses are applied to the pulse dividng network 304 and divided thereby, as described in greater detail hereinbefore.

The switch 318 is then actuated to connect conductor 317 to conductor 320 or 321, and consequently to an "up" or "down" input of up-down counter 311 and thus to provide pulses at a high rate, i.e., 10 pulses per second, from the pulse dividng network 304 to the selected one of the "up" and "down" inputs of the up-down counter 311. In this way, the setting of the program start temperature, i.e., of the digital demand signal applied by the up-down counter 311 to the digital-to-analogue converter 313, is rapidly advanced or retarded to a starting value representing the desired starting temperature B. The analogue demand signal, supplied from the digital-to-analogue converter 313 through conductor 315 to conductor 45, and displayed in digital form by the digital display unit 314b, is applied to one of the inputs of the comparator 410, shown in FIG. 4 for comparison with the workpiece temperature signal on the conductor 46, which is obtained from the lowermost thermocouple TC2.

The comparator 410 compares the temperature signal and the demand signal and provides an error signal on conductor 415 which corresponds to the difference between the temperature signal and the demand signal. The error signal on conductor 415 is applied to the switching module 416 for controlling the control signal on conductor 53 and thereby controlling the power supply to the heating elements 25 and 26.

More particularly, the switching module 416 is operated by the error signal to actuate movable contact C1 in the switch unit 39 connecting the auto-transformer TR1 or TR2 to the conductor 53. When the demand signal remains constant, the operation will eventually stabilize with some error when the temperature signal rises sufficiently to become equal to the demand signal. This error is intrinsic in any control having only a single term. Ideally, the error signal should be zero, i.e., the actual temperature of the workpiece should be equal to its predetermined desired temperature, as represented by the demand signal. To accomplish this, the error signal from the comparator 410 is also applied to the integrator 418, which serves to slowly modify the operation of the switching module 416 in such a manner that the error signal will eventually be reduced to zero. Consequently, the apparatus performs as a two-term controller, and effectively the integrator moves the control band regardless of the power setting of any external equipment. In addition, the integrator serves to modify the operation of the switching module 416 during the heating of the workpiece up to the soak temperature B, so that the rate of increase of the workpiece temperature is reduced as the workpiece temperature approaches the desired soak temperature in order to substantially reduce overshooting of the desired soak temperature.

The demand signal on conductor 45 and the workpiece temperature signal on conductor 46 are also compared by the comparator 316 which, when these signals become equal, transmits a start signal through conductor 327 to a "start" input of the up-down counter 311.

The up-down counter 311 is thereby caused to change the demand signal on conductor 312 at a rate determined by the setting of the binary counter 310. The changing demand signal will then continue to increase until it becomes equal to the level of the signal from the preset soak temperature potentiometer 422, whereupon the comparator 424 provides a soak signal on conductor 47 which is applied via conductor 48 (FIG. 3) to the pulse dividing network 304 and simultaneously to the "hold" inlet of the up-down counter 311. The input of the soak signal to pulse dividing network 304 initiates the supply of the pulses at the rate of 2 pulses per hour from the pulse dividng network 304 through the conductor 309 to the pulse counter 322, the purpose of which is to maintain the workpiece at the soak temperature for a "soak" period of time determined by the adjustment of the soak time selector switch 324.

The application of the soak signal to the "hold" input of the up-down counter 311 causes the latter to assume a "hold" condition, so that the demand signal on conductor 312 remains constant for the "soak" period.

It will be noted that the automatic operation of the apparatus can be interrupted manually at any time by closure of the manual hold switch 329 to apply the voltage V1 to the "hold" input of the up-down counter 311.

When the pulse counter 322 has completed its set count, i.e. at the end of the soak period, a signal is transmitted from the output of the pulse counter 322 via conductor 323 to a countdown input of the up-down counter 311, which thereupon begins to count down, at a rate determined by the setting of the binary counter 310, to correspondingly reduce the demand signal on conductor 45. The temperature of the workpiece is thereby reduce at the pre-selected rate.

As mentioned hereinbefore, the temperature signals from the thermocouples TC1 and TC2 are compared in the control unit in order to effect bypassing of the uppermost heating element 25 when the difference between the two temperature control signals exceeds a predetermined amount. For this purpose, the temperature signals are applied by the conductors 404 and 408 to the differential amplifier 400 which, in response to the predetermined difference in the temperature signals, provides an output signal to switching module 401, which is thereby operated to actuate movable contact C2 into a closed position, thereby to interrupt the supply of electrical current to the uppermost heating element 25 by connecting the conductors 61 and 62, and simultaneously to changeover movable contact C3 from the conductor 38 of the auto-transformer TR1 to the conductor 41 of the auto-transformer TR2.

Instead of being employed on a single workpiece, as shown in FIG. 1, the heating elements 25 and 26 may be employed on separate workpieces, as illustrated in FIG. 5, in which the two workpieces comprise pipes 510 and 511, the pipe 511 being of considerably larger size than the pipe 510. As a consequence of this difference in the size of the pipes, the pipe 510 will tend to become heated more quickly than the pipe 511, and accordingly, the thermocouples TC1 and TC2 can be employed to sense the difference between the temperatures of the two pipes for controlling the bypassing of the heating element 25, as will be clear from the above description of the embodiment of the invention illustrated in FIGS. 1 to 4.

Various modifications may be made in the above-described apparatus. For example, a mechanical arrangement, e.g., a cam-controlled potentiometer, may be employed instead of the above-described electronic equipment to provide the demand signal in a much-simplified embodiment of the invention.

The embodiment of the invention illustrated in the drawings may be modified by employing thyristors in place of the above-described auto-transformers.

Various other possible modifications of the invention will be readily apparent to those skilled in the art.

We claim:

1. Power supply and control apparatus for pre-weld heating and weld stress relief, comprising:
    a. first and second electrical resistance heating elements;
    b. means for connecting said first and second electrical resistance heating elements in series with one another for heating different workpiece zones;
    c. a power input transformer for supplying electrical power to said first and second electrical resistance heating elements;
    d. a saturable reactor connected between said transformer and said first and second electrical resistance heating elements for controlling the supply of electrical power from said transformer to said first and second electrical resistance heating elements;
    e. first voltage control means for providing a first control voltage to said satruable reactor to provide a predetermined electrical power to said first and second electrical resistance heating elements;
    f. second voltage control means for providng a second control voltage to said saturable reactor to control said saturable reactor for providing a lower electrical power to said first electrical resistance heating element;
    g. first and second temperature responsive means respectively associated with said first and second electrical resistance heating elements for providing temperature signals corresponding to the temperatures of the respective workpiece zones of said first and second electrical resistance heating elements;
    h. means for comparing the temperature signals from said first and second temperature responsive means and providing an output signal when the difference between the temperature signals exceeds a predetermined amount; and
    i. switch means responsive to said output signal for disconnecting said first voltage control means from said saturable reactor and connecting said second voltage control means to said saturable reactor.

2. Power supply and control apparatus as claimed in claim 1, and further comprising means for variably regulating the first and second control voltages to vary the power supplied through said saturable reactor.

3. Power supply and control apparatus as claimed in claim 2, wherein said regulating means comprise signal generator means for generating a demand signal which varies in accordance with a predetermined heating programme, error signal means for comparing said demand signal with the temperature signal of said second temperature responisve device, to provide an error signal, and switch means response to the error signal for controlling the connection of the first and second control voltages to said saturable reactor.

4. Power supply and control apparatus as claimed in claim 3, further comprising integrator means connected between said error signal means and said switch means.

5. Power supply and control apparatus as claimed in claim 1, wherein said temperature signal comparing means comprise a differential amplifier having a pair of inputs, and first and second sample and hold means are provided for respectively connecting said first and second temperature responsive means to said pair of inputs.

6. Power supply and control apparatus as claimed in claim 3, wherein said demand signal generating means comprise pulse dividng means for producing a plurality of pulse trains of different frequencies, and binary counter means responsive to said pulse trains for varying the demand signal as a function of time.

7. Power supply and control apparatus as claimed in claim 6, wherein rate select means for adjustably controlling the rate of variation of the demand signal are operatively associated with said binary counter means.

8. Power supply and control apparatus as claimed in claim 6, further comprising adjustable means for generating a preselectable soak temperature signal, means responsive to equalization of said soak temperature signal and said demand signal for applying a soak signal to stop said binary counter, a pulse counter responsive to said soak signal for initiating countdown of said binary counter means, and means for supplying pulses from said pulse dividng means to said pulse counter.

9. Power supply and control apparatus as claimed in claim 6, further compriing means responsive to equalization of said demand signal and one of said temperature signals for initiating the variation of said demand signal by said binary counter means.

10. Power supply and control apparatus as claimed in claim 1, wherein said first and second voltage control means comprise variable auto transformers.

11. A method of controlling a power supply to a pair of heating elements connected in series with one another, comprising the steps of:

energizing said heating elements to heat respective workpiece zones, sensing the temperatures of the workpiece zones to provide temperature signals corresponding to the temperatures of the respective zones, providing two different voltages and using one of said voltage to control a saturable reactor for regulating the power supplied to the heating elements, comparing the temperature signals with one another, automatcally initiating short circuiting of the power supply across one of the heating elements when one of the temperature signals exceeds the other by a predetermined amount, and simultaneous discontinuing the use of said one voltage and initiating the use of the other of the voltages for controlling the saturable reactor to thereby adjust the power supply to the remaining heating element to compensate for the reduction in load.

12. A method as claimed in claim 11, which includes generating a demand signal representing the required temperature of one of the zones, comparing the corresponding temperature signal with said demand signal to provide an error signal, employing the error signal to control the application of one of said voltages to said saturable reactor, varying the demand signal at a preselected rate of variation, generating a predetermined soak signal representing a desired workpiece soak temperature, comparing the soak signal and the demand signal to discontinue the variation of the demand signal on equalization of the demand and soak signals and to simultaneously initiate a timing operation, and initiating a decreasing variation of the demand signal on completion of the timing operation.

* * * * *